United States Patent Office 3,038,912
Patented June 12, 1962

3,038,912
20(β) - [(MONOALKYLAMINO)METHYL]PREGN - 5-EN-3β-OLS, ESTERS CORRESPONDING AND INTERMEDIATES THERETO
Leonard N. Nysted, Highland Park, Ill., assignor to G. D. Searle & Co., Chicago, Ill., a corporation of Delaware
No Drawing. Filed July 21, 1961, Ser. No. 125,678
8 Claims. (Cl. 260—397.1)

The present invention is concerned with novel steroidal amines of the pregnane series and, more particularly, with 20(β) - [(monoalkylamino)methyl]pregn-5-en-3β-ols and esters thereof, which are represented by the structural formula

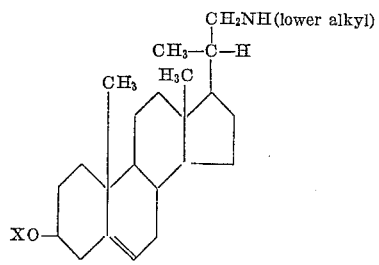

wherein the —OX radical can be hydroxy or (lower alkanoyl)-oxy.

A further object of this invention is the provision of novel 20(β)-[N-(lower alkyl)carboxamido]-pregn-5-en-3β-ol- 3-acetates of the structural formula

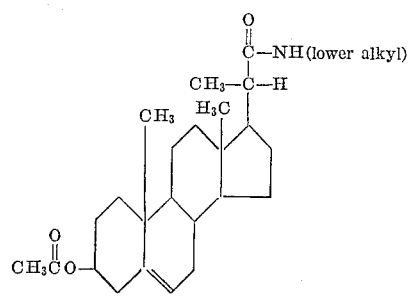

which are useful as intermediates in the manufacture of the aforementioned 20(β)-aminomethyl-3β-hydroxy compounds.

Examples of the lower alkyl radicals encompassed in the structural formulae supra are methyl, ethyl, propyl, butyl, pentyl, hexyl, and the branched-chain isomers thereof. Lower alkanoyl radicals represented by X in those formulae are, typically, formyl, acetyl, propionyl, butyryl, valeryl, caproyl, and their branched-chain isomers.

The compounds of this invention can be manufactured by starting with 20(β)-carboxypregn-5-en-3β-ol 3-acetate. This carboxylic acid is converted to the corresponding acid chloride, suitably by reaction with thionyl chloride in the presence of a catalytic quantity of pyridine. That acid chloride is allowed to react with the appropriate aliphatic primary amine in a suitable inert organic solvent to yield the corresponding intermediate 20(β)-[N-(lower alkyl)-carboxamido]pregn-5-en-3β-ol 3-acetate. This process is typified by the reaction of 20(β)-chlorocarbonylpregn-5-en-3β-ol 3-acetate with isobutylamine in benzene to produce 20(β) - (N-isobutylcarboxamido)pregn-5-en-3β-ol 3-acetate. Reduction of these intermediate amides, suitably by means of lithium aluminum hydride, affords the instant 20(β)-[(monoalkylamino)methyl]pregn-5-en-3β-ols.

The aforementioned 20(β) - (N - isobutylcarboxamido)-pregn-5-en-3β-ol 3-acetate, for example, is treated with lithium aluminum hydride in refluxing dioxane to yield 20(β)-[(isobutylamino)methyl]pregn-5-en-3β-ol.

The instant amines which contain an esterified hydroxy group at position 3 can be prepared from the corresponding alcohols by reaction with the appropriate lower alkanoic acid in the presence of an esterification catalyst. As a specific example, 20(β)-[(isobutylamino)methyl]-pregn-5-en-3β-ol hydrochloride is converted to the corresponding 3-acetate by reaction with acetic acid in the presence of hydrogen chloride.

Equivalent to the organic bases of this invention are the corresponding non-toxic acid and quaternary salts, which are exemplified by the citrate, tartrate, maleate, ascorbate, gluconate, lactate, succinate, phosphate,, sulfate, hydrobromide, hydrochloride, methobromide, methochloride, methosulfate, and ethosulfate.

The compounds of the present invention exhibit valuable pharmacological properties. They are, for example, potent hypocholesterolemic agents and are also inhibitors of gastrointestinal acid secretion. In addition, they lack the sodium-excreting side effect of related prior art compositions.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (°C.). Quantities of materials are expressed in parts by weight unless otherwise noted.

Example 1

To a suspension of 30 parts of 20(β)-carboxypregn-5-en-3β-ol 3-acetate in 213 parts of ether is added, with stirring, 32.8 parts of thionyl chloride and 0.05 part of pyridine. Stirring is continued at room temperature for about 3 hours, during which time the reaction mixture becomes homogeneous. The volatile materials are removed by distillation at reduced pressure, and the residue is extracted with benzene. Concentration of the benzene solution to dryness at reduced pressure affords crystals of 20(β)-chlorocarbonylpregn-5-en-3β-ol 3-acetate, which is represented by the following structural formula

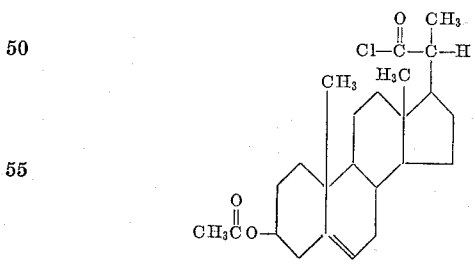

Example 2

To a solution of 10 parts of 20(β)-chlorocarbonyl-pregn-5-en-3β-ol 3-acetate in 80 parts of benzene is added 17.35 parts of isopropylamine, and the resulting solution is allowed to stand at room temperature for about 3 hours, is concentrated to dryness at reduced pressure. The crystalline residue is triturated with hot water, then is collected by filtration, washed on the filter with hot water, and dried to yield 20(β)-(N-isopropylcarboxamido)pregn-5-en-3β-ol 3-acetate, which is represented by the structural formula

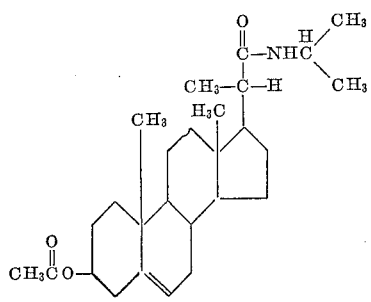

*Example 3*

To a refluxing suspension of 10 parts of lithium aluminum hydride in 206 parts of dioxane is added dropwise, with stirring, a solution of 10 parts of 20(β)-(N-isopropylcarboxamido)pregn-5-en-3β-ol 3-acetate in 103 parts of dioxane. Refluxing is continued for about 16 hours, at the end of which time the reaction mixture is cooled and cautiously treated by the successive addition of 10 parts of water, 8 parts of 20% aqueous sodium hydroxide, and 35 parts of water. The precipitated salts are removed by filtration and washed on the filter with dioxane. The filtrate is diluted with ethyl acetate and ether, then washed with water, dried over anhydrous sodium sulfate, and concentrated under reduced pressure to a crystalline solid, which is 20(β)-[(isopropylamino)methyl]pregn-5-en-3β-ol.

A solution of the latter amine in methanol is acidified with isopropanolic hydrogen chloride, and is diluted with about 5 volumes of ether. The resulting precipitate is washed on the filter with ether, is dried, then is recrystallized from methanol-ethyl acetate to yield pure 20(β)-[(isopropylamino)methyl]pregn - 5 - en-3β-ol hydrochloride of the structural formula

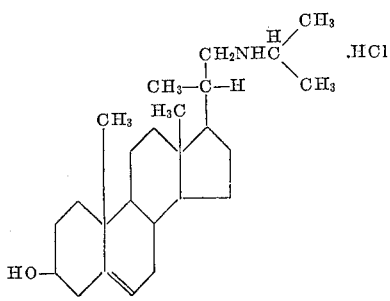

*Example 4*

A solution of 20 parts of 20(β)-chlorocarbonyl-pregn-5-en-3β-ol 3-acetate in 160 parts of benzene is treated with 43 parts of isobutylamine. This reaction mixture is kept at room temperature for about 4 hours, then is stripped of volatile materials by distillation in vacuo. Trituration of the crystalline residue with hot water affords the product, which is collected by filtration, washed with hot water on the filter, and dried to produce 20(β)-(N-isobutylcarboxamido)pregn - 5 - en - 3β-ol 3-acetate, M.P. about 194–197°. This compound is represented by the structural formula

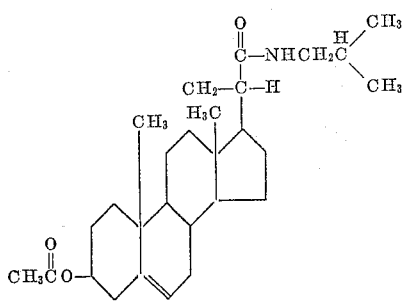

*Example 5*

A solution of 5 parts of 20(β)-(N-isobutyl-carboxamido)pregn-5-en-3β-ol 3-acetate in 50 parts of dioxane is added dropwise to a refluxing slurry of 5 parts of lithium aluminum hydride in 103 parts of dioxane. The reaction mixture is heated at the reflux temperature for about 16 hours, then is cooled. To the cooled solution is added successively 5 parts of water, 4 parts of 20% aqueous sodium hydroxide, and 18 parts of water. The resulting precipitate is removed by filtration and washed on the filter with dioxane. Dilution of the filtrate with ether and ethyl acetate affords an organic solution, which is washed with water, dried over anhydrous sodium sulfate, and concentrated to dryness in vacuo to yield 20(β)-[(isobutylamino)methyl]pregn-5-en-3β-ol.

Dissolution of the latter amine in methanol followed by acidification with isopropanolic hydrogen chloride and dilution with ether affords the crude hydrochloride, which is collected by fitration, washed with ether, dried and recrystallized from methanolethyl acetate to afford pure 20(β)-[isobutylamino)methyl]-pregn - 5' - en-3β-ol hydrochloride, M.P. about 280–300° (dec.). It has the structural formula

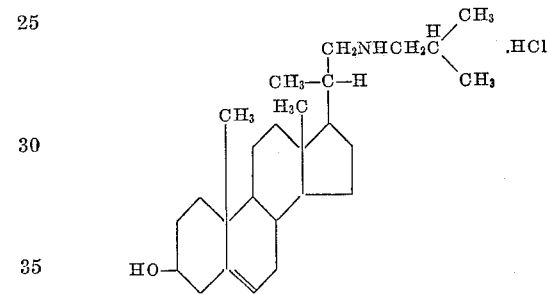

*Example 6*

The substitution of 25.6 parts of isoamylamine for isopropylamine in the procedure described in Example 2 results in 20(β) - (N-isoamylcarboxamido)pregn-5-en-3β-ol 3-acetate. Its is represented by the structural formula

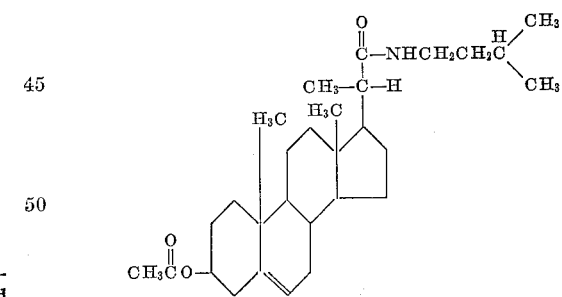

*Example 7*

By substituting 10 parts of 20(B)-(N-isoamylcarboxamido)pregn-5-en-3β-ol 3-acetate and otherwise proceeding according to the processes of Example 3, 20(β)-[(isoamylamino)methyl]pregn-5-en-3β-ol hydrochloride is obtained. It has the following structural formula

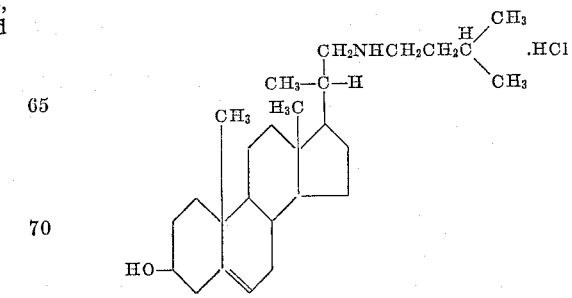

*Example 8*

A solution of 10 parts of 20(β)-[(isobutylamino)- methyl]pregn-5-en-3β-ol hydrochloride in 100 parts of acetic acid containing 3% by weight of anhydrous hydrogen chloride is stirred at room temperature for about 24 hours, then is concentrated to dryness at reduced pressure. The residue is dissolved in water and this aqueous solution is washed with ethyl acetate, then made basic by the addition of dilute aqueous sodium hydroxide. The resulting alkaline mixture is extracted with ether, and the organic layer is washed with water, dried over anhydrous sodium sulfate, and evaporated to afford 20(β)-[(isobutylamino)methyl]pregn-5-en-3β-ol 3-acetate, which has the following structural formula

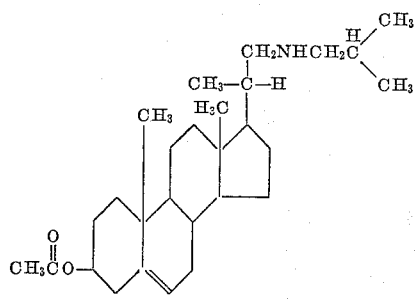

*Example 9*

The reaction of 5 parts of 20(β)-[(isoproplyamino)methyl]pregn-5-en-3β-ol hydrochloride and 50 parts of propionic acid, containing 3% by weight of anhydrous hydrogen chloride, according to the process of Example 8 results in 20(β)-[(isopropylamino)methyl]pregn-5-en-3β-ol 3-propionate of the structural formula

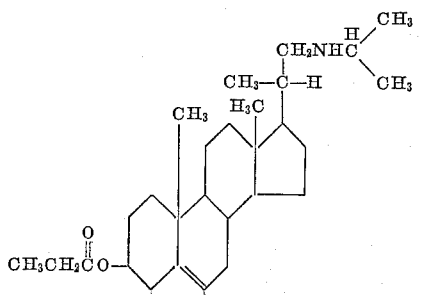

What is claimed is:
1. A compound of the structural formula

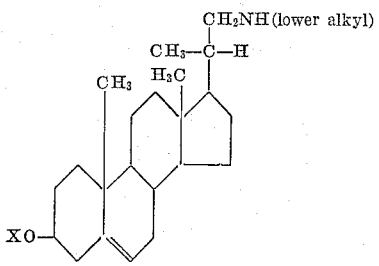

wherein X is selected from the group consisting of hydrogen and lower alkanoyl radicals.
2. 20(β)-[(isopropylamino)methyl]pregn-5-en-3β-ol.
3. 20(β)-[(isobutylamino)methyl]pregn-5-en-3β-ol.
4. 20(β)-[(isoamylamino)methyl]pregn-5-en-3β-ol.
5. A compound of the structural formula 6. 20(β)-(N-isopropylcarboxamido)pregn-5-en-3β-ol 3-acetate.
7. 20(β)-(N-isobutylcarboxamido)pregn-5-en-3β-ol 3-acetate.
8. 20(β)-(N-isoamylcarboxamido)pregn-5-en-3β-ol 3-acetate.

References Cited in the file of this patent
UNITED STATES PATENTS
2,108,646    Bockmuhl et al. _____ Feb. 15, 1938